May 19, 1942.    J. W. FLUDE    2,283,200
METHOD AND APPARATUS FOR SUBSURFACE MINING
Filed Sept. 16, 1939    3 Sheets-Sheet 3
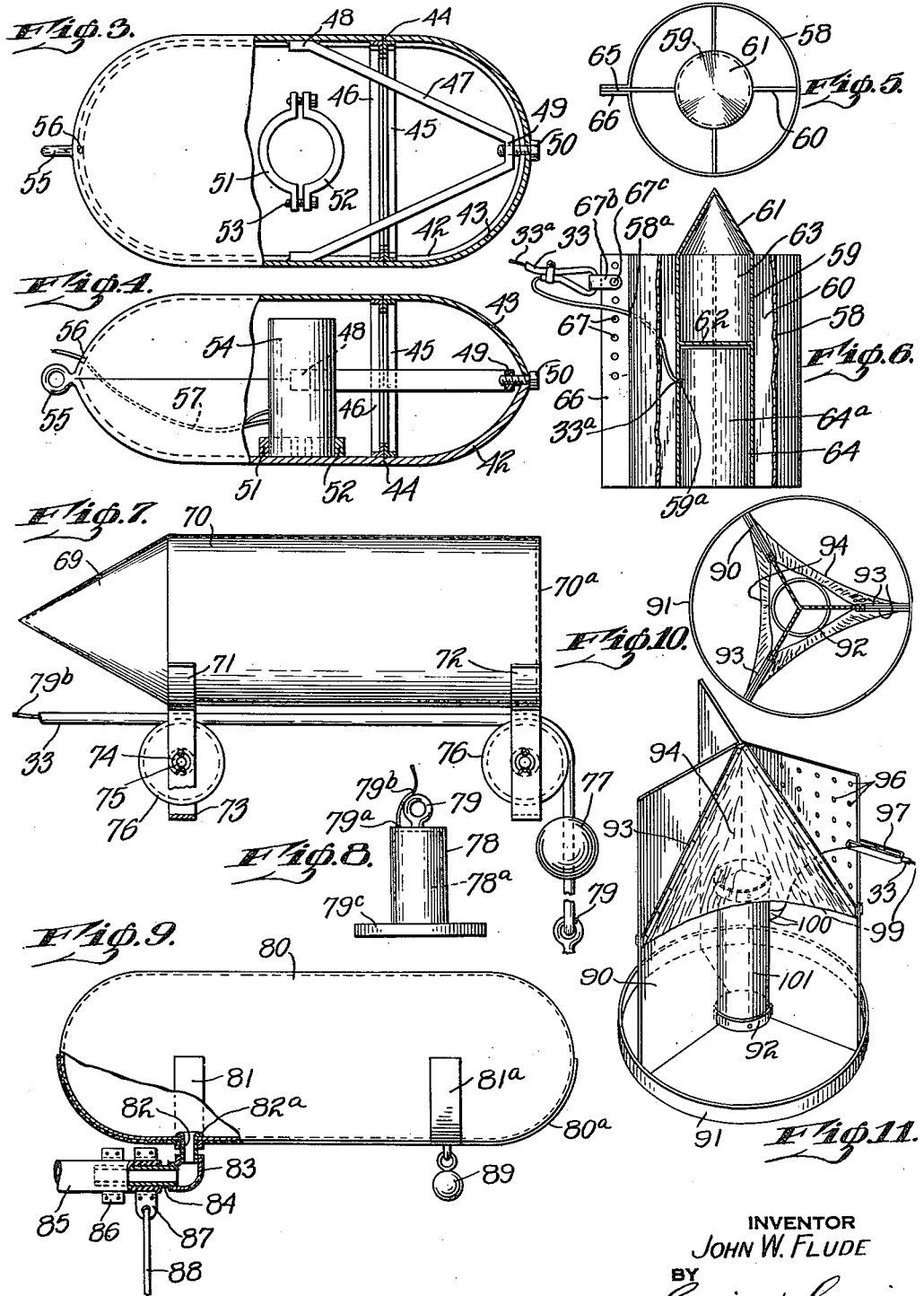
INVENTOR
JOHN W. FLUDE
BY
Cousins & Cousins
ATTORNEY Patented May 19, 1942

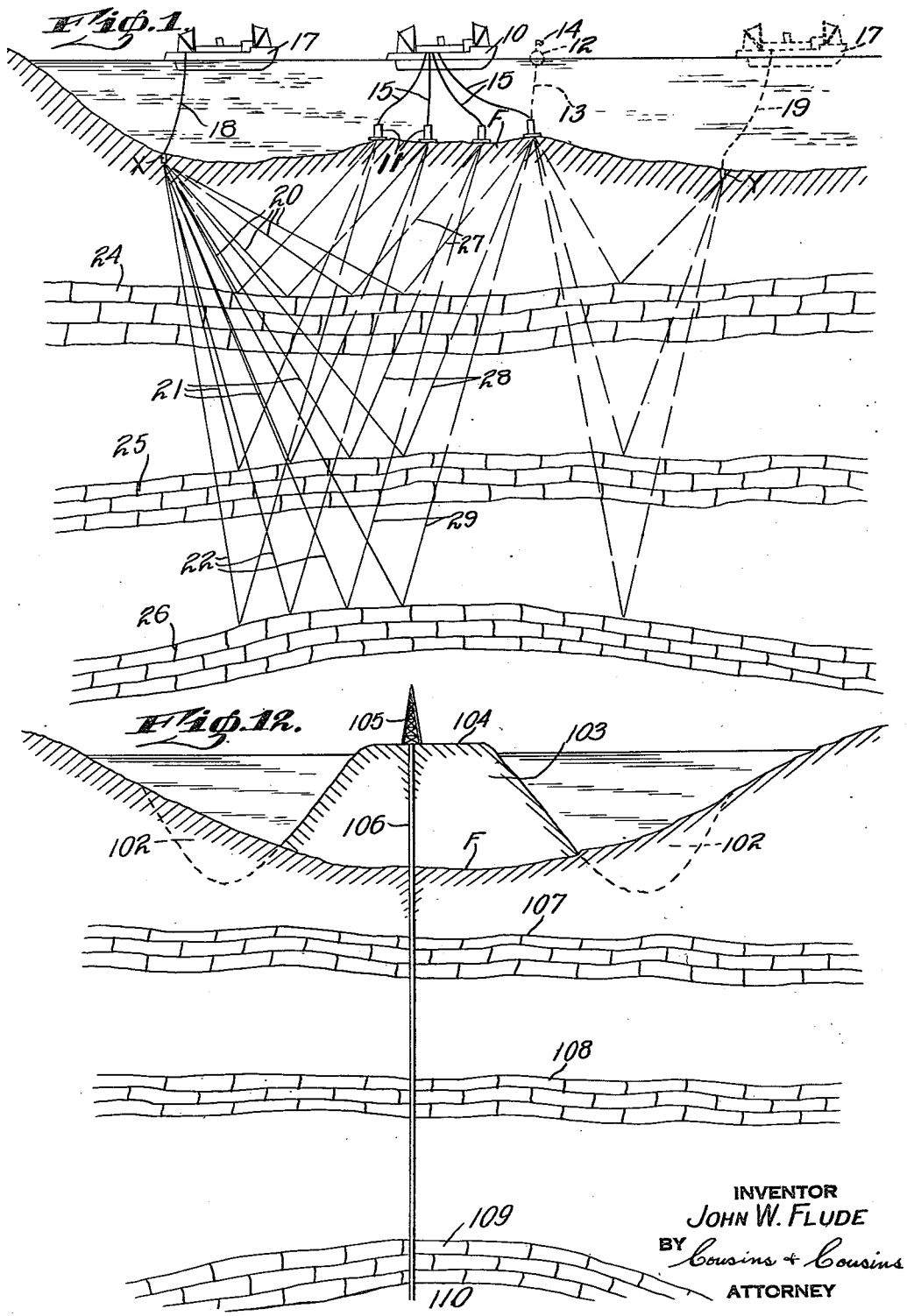

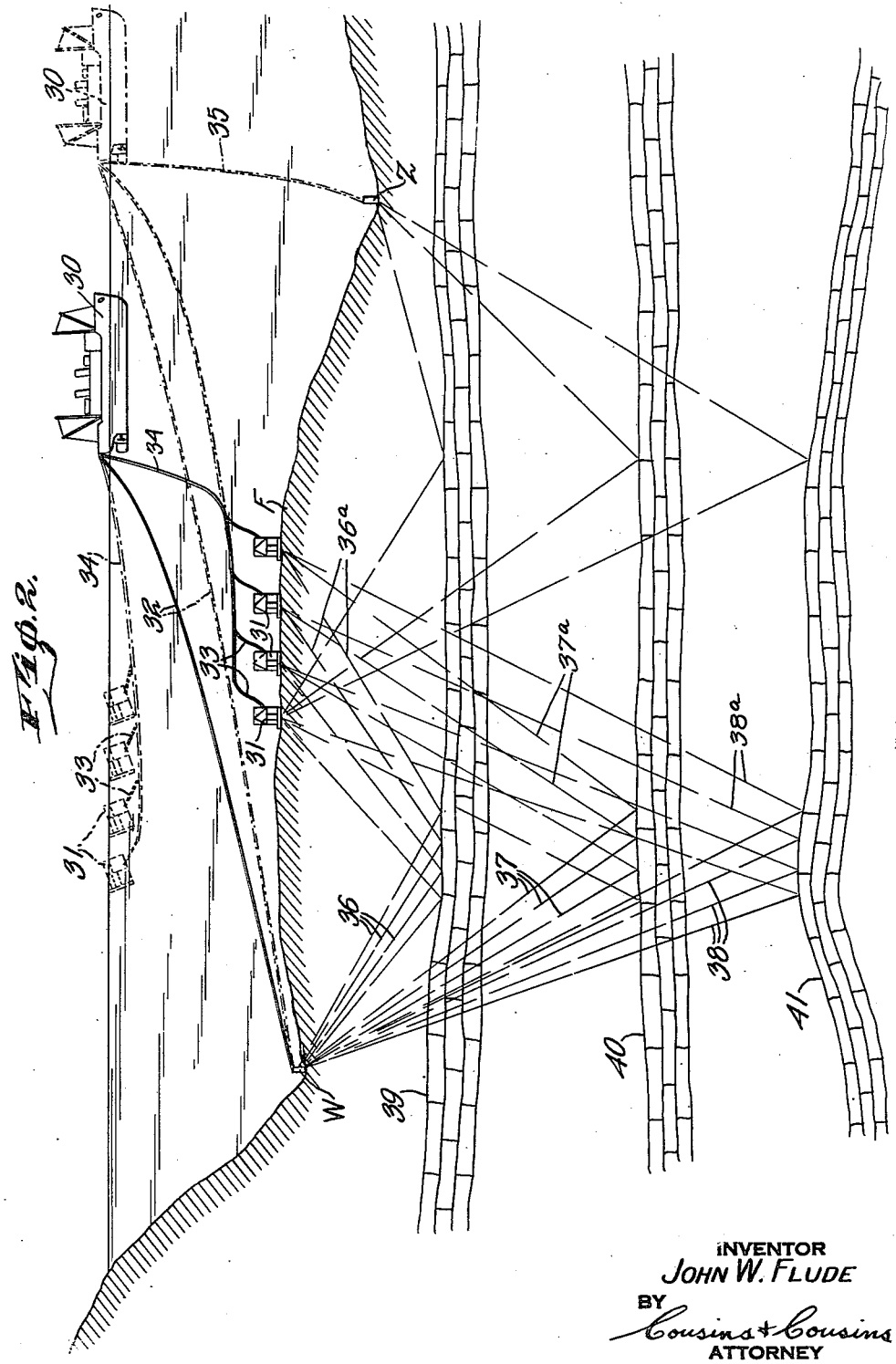

2,283,200

UNITED STATES PATENT OFFICE 2,283,200

METHOD AND APPARATUS FOR SUB-SURFACE MINING

John William Flude, New Orleans, La.

Application September 16, 1939, Serial No. 295,198

11 Claims. (Cl. 181—0.5)

This invention relates to locating and mining sub-surface mineral bodies. It is particularly concerned with a method of making geophysical observations for the purpose of determining the location and nature of mineral bearing or petroliferous under-water geological formations, an apparatus for use in making such observations and a method by which geological formations so identified may be practicably mined. Included in the novel mining method is a step of creating land above water upon which mining structures and equipment may be supported.

Seismographic exploration of sub-surface structures, particularly those containing oil or sulphur, is now well known. It is commonly accomplished by the use of an electrical seismograph comprising a detector or "geophone" capable of detecting the slightest earth movements. The detector is usually of the coil and magnet type and is connected to an amplifier of the electrical current generated by the detector and a galvanometer type of oscillograph arranged so that a light beam reflected by a mirror on the galvanometer records ground waves on a moving strip of photo-sensitive paper. When such seismograph is placed in a predetermined position with respect to one or more "shot points," it records the amplitude and frequency of the reflected and refracted waves resulting from a shock created at such points. Analysis of the developed photographic film enables the geophysicist to determine with reasonable accuracy the nature of the sub-surface formations at various levels between the detector, of which more than one is commonly used, and the shot points.

In under-water exploration as at present practiced, a number of detectors must be placed by hand in upright position upon the ocean floor, and connected, as by a wired cable, to the vessel making the observations. The detectors pick up the reflected and refracted waves emanating from pre-located shot points, convert them into electrical energy and transmit them to an amplifier—galvanometer—oscillograph arrangement located on the vessel. When the detectors are in proper position shocks are imparted to the earth at predetermined shot points spaced therefrom, as by separately exploding charges of dynamite at such points. In order to accomplish this the personnel aboard the vessel have heretofore been required to establish the shot points and to plant the detectors separately.

As at present practiced the usual exploration crew sets out from a base in three or more vessels, such as lugger-type motor boats, one carrying the recording crew, one the surveying crew and one the "shooting" crew. At the base are moored a houseboat, a dynamite barge and a barge for carrying gasoline and supplies. After the area to be explored is surveyed and the shot points and detector locations calculated, identified and marked, the "shooting" crew proceeds to the first shot point and there plants a charge. The recording crew proceeds to the detector locations at which two small boats are put over the side, from which the detectors are planted at predetermined spaced intervals in line with the first shot point and connected by cables to the recording vessel. On a signal from the recording vessel the charge at the first shot point is detonated and the shooting boat proceeds to another shot point, predetermined by the surveyors, and there plants and explodes a second charge.

After the charges have been exploded and the desired seismographic record taken, the small boats pull up the detectors and bring them back to the recording vessel. Such procedure is slow and tedious and cannot be used to survey more than about five or six miles per day. Wind and sea conditions are likely to hamper, if not prevent, putting small boats over the side and planting the detectors. Moreover, such procedure requires the expenditure of much time, labor and materials, and consequent increase in the expense of exploration.

Furthermore, it has been difficult to place the detectors quickly and accurately in the correct geometric position with respect to each other and to the predetermined shot points, accurate positioning being an important consideration in making dependable surveys.

After the area under observation has been explored and the nature and sometimes the contour and extent of the geological formations thereunder determined, there is no known way of mining the mineral deposits contained therein, except by sinking, piling and erecting a crib thereon, on which mining operations can be carried out. This method is expensive and is limited to relatively shallow water. Moreover, structures constructed on piles are particularly subject to damage and deterioration by heavy seas.

The present invention provides a quick, simple and practical way of, and means for, overcoming many of the difficulties encountered on under-water explorations of the type described, and in mining deposits located thereunder.

Briefly described, the invention comprises a method of making a continuous geophysical survey of land located under water from a single moving vessel by temporarily positioning seismographic detectors at spaced, predetermined points on the ocean floor for a time sufficient to permit one or more wave-generating explosions to take place and be recorded, then removing the temporarily positioned detectors while the vessel is still under way, and proceeding to another point or points at which the cycle is repeated.

Toward this end the invention also comprises an apparatus for carrying and substantially automatically positioning such detectors, which apparatus comprises a detector carrier designed so that the same may be towed through the water until a pre-charted location is reached, and then quickly brought to the bottom where the detectors are held in an upright position with their bases in contact with the bottom, and so that they may be quickly brought out of contact with the bottom for reuse at another location after they have performed their required function.

The invention is directed to the achievement of these ends.

The invention consists of the construction, combination and arrangement of parts and the steps of the methods, as herein illustrated, described and claimed.

In the accompanying drawings forming part hereof, are illustrated several embodiments of the physical structure and methods involved in the practice of the invention, in which drawings similar reference characters designate corresponding parts, and in which:

Figure 1 is a diagrammatic section illustrating certain geological formations below the ocean floor and the position of the vessels and equipment required to make an underwater survey according to present known methods.

Figure 2 is a view similar to Figure 1, illustrating one way in which the surveying method of the present invention may be accomplished.

Figure 3 is a plan view, with parts in section, of one form of device that may be used to carry out the surveying method described in connection with Figure 2.

Figure 4 is a side elevation, with parts in section, of the device shown in Figure 3.

Figure 5 is a plan view of another form of the device capable of use in carrying out the surveying method of the invention.

Figure 6 is a side elevation, with parts in section, of the device shown in Figure 5.

Figure 7 is a side elevation of a float arrangement which may be used in an underwater survey, according to the invention.

Figure 8 is a side elevation of one form of detector that may be used with the arrangement of Figure 7.

Figure 9 is a side elevation, with parts in section, of another form of float arrangement.

Figure 10 is a plan view of still another type of detector carrier suitable for use in a survey, according to the invention, with certain parts broken away.

Figure 11 is a perspective of the device shown in plan in Figure 10.

Figure 12 is a diagrammatic section of the ocean floor and underlying geological formation showing how the former may be dredged out and disposed over the area to be mined in order to form an island.

In Figure 1, which as above indicated, illustrates how underwater surveying is at present accomplished, the "shooting" boat 17 plants a charge of explosive at a predetermined point X, to which explosive a detonating cap and a pair of wires 18 are connected. The recording vessel 10 proceeds a plotted distance on a plotted course from point X where the surveying vessel has marked the location at which the detectors are to be planted, as by buoys 12 having marker flags 14 and anchor lines 13. At such location vessel 10 heaves to, and puts over its small boats containing the detectors and gear. The crews of the small boats thereupon plant a plurality of detectors 11 at spaced intervals upon the ocean floor F. Each detector must be separately handled and planted in substantially equidistant spaced relationship with each other and in predetermined spaced relationship with shot point X. It is important also that each detector be planted in vertical or upright position.

A pair of connecting wires 15 is attached to each detector 11, the ends of which are brought aboard the recording vessel 10 and connected into the amplifying and recording system operated by the personnel of the geophysical exploration party.

After the detectors 11 have been planted and on a signal from the recording vessel, the "shooting" vessel 17 explodes the charge at X, and the observers aboard vessel 10 take the required seismographic reading and record. The vessel 17 then proceeds to another point such as Y, predetermined and marked by the surveyors, and there plants another explosive charge which it explodes through wires 19 on a signal from vessel 10. A second reading and record is taken during the explosion of this second charge. The "shooting" vessel 17 must then wait until the detectors 11 are picked up by the small boats, hauled aboard the vessel 10 and moved beyond the vessel 17 to the next recording position.

At the time each blast occurs, ground waves are induced into the earth's surface and travel downwardly along seismic travel paths 20, 21 and 22, until reflected by whatever relatively hard geological strata 24 to 26 are present below the ocean floor. The reflected waves traveling along paths 27 to 29, are picked up by detectors 11, converted into electrical energy and transferred through wires 15 into the seismographic amplifying and recording devices located on the vessel 10.

The reception, conversion and recording of the ground waves induced at shot points X and Y are well known and need not be further described. From the data obtained the geophysicist is able to calculate the distance from the bed of the ocean to each reflecting stratum or horizon, the time taken for the waves to reach the detectors and their average velocity through the intervening space being utilized for the purpose of this computation, as will be recognized by persons skilled in the art.

The procedure above described requires the expenditure of a great deal of time and the handling of much equipment. It permits accurate surveying over an area having a linear dimension of only one to six miles, for each day the surveying screw is at work.

In Figure 2 I have illustrated how underwater surveying of the nature described may be accomplished by the application of the principles of the present invention. After a charge is placed on the bed of the ocean as at W, the exploration ship 30 proceeds on its plotted course a pre-determined distance, during which time a plurality of detector carriers 31 are towed astern as by cable 34 and taps 33, the taps 33 being of equal length and being connected to cable 34 in equidistantly spaced relationship. Wires 99 (see Figure 11) are included within cables 33 and 34 for connection to suitable recording equipment within vessel 30. A pair of wires or a wire-containing cable 32 is paid out from vessel 30 in order to maintain connection with shot point W.

The detector carriers, certain forms of which will hereinafter be more particularly described, are designed so that they may be towed at spaced intervals astern of vessel 30 without fouling the towing cables. They may be towed at or somewhat below the surface as indicated by the dot and dash lines of Figure 2, or they may be towed at or adjacent the bottom, depending upon the specific design of the carrier. Preferably, the carriers are towed near the surface as indicated in Figure 2, and for this purpose I shall describe the method as carried out by the use of a carrier of the type more particularly described hereinafter in connection with Figures 10 and 11. Whatever the specific type, however, these carriers are adapted and arranged to be towed at evenly spaced intervals astern of the vessel 30, and to settle quickly upon the ocean floor in evenly spaced relationship and in vertical position when the vessel is hove to or when the hauling tension on cable 34 and on taps 33, is released.

In the full lines in Figure 2 I have shown the position of carriers 31 when the carriers have settled to the ocean floor F at spaced intervals, the cables 33 and 34 having been slacked off. The detectors shown in the figure are greatly enlarged with respect to the vessel 30 and their spacing is thereby considerably altered, the proportioning shown being deemed necessary for the purpose of facilitating illustration. The vessel 30 carrying connecting wires 32, preferably in the form of a cable, connected to the charge W may then proceed to the position indicated by the dot and dash lines, at which the geophysical exploration party may plant another charge at Z, spaced a predetermined distance from the charge W and from detectors 31 and connected to the vessel 30 by wires or cable 35. Suitable markings or indicia may be provided at spaced intervals on wire or cables 32 and 35 in order to aid in determining the proper recording position of vessel 30.

The charges W and Z are then exploded consecutively and the record of the amplitude and frequency of waves traveling over paths 36—38, which are reflected as indicated at 36a—38a to the detectors 31, obtained in known manner so that the approximate location and nature of the underlying geological formations 39, 40, 41, may be ascertained. The vessel 30 does not have to stand by and pick up any manually placed detectors or buoys, nor does a separate "shooting" vessel have to stand by at point W to explode the charge at that point.

Vessel 30 may proceed immediately to the point at which the detectors are proposed to be positioned for a second reading. The wires or cables 32 and 35 are severed by the explosion and may be reeled in while the ship is proceeding, and when the cable 34 is put under tension the detectors 31 rise to the surface and soon take their properly spaced towing position astern of the vessel, as indicated in the dot and dash lines of Figure 2.

If desired, the charges at W and Z may be exploded by remote control, as by providing a radio receiving circuit at such points having an oscillator tube tuned to a predetermined frequency so that such tube energizes a detonating circuit.

This procedure is quick and efficient, and permits covering an area extending a linear distance of 100 to 200 or more miles for each day in which operations are conducted. The necessity for separate vessels and crews for shooting, surveying and recording is dispensed with and the handling of unnecessary gear is eliminated.

In Figures 3 and 4 I have shown a form of detector carrier adapted for use in making surveys according to the invention, the detector being adapted to be towed either over land or under water. The device is preferably constructed in a generally walnut shape consisting of cupped halves 42 and 43, the latter being placed over the former and secured thereto as by welding. Preferably the respective halves of the shell are formed of strong, relatively heavy metal, the lower half 42 being twice as thick as the upper, so that it acts somewhat as a keel in order to insure the travel of the shell in a position so that it will hold the detectors 54 in an upright position. The shell may be cut adjacent its rear end as at 44 and the interior surface adjacent the cut provided with angle members 45 securely welded to the forward and rear portions of the separate parts formed by the cut. The faces of the angle members 45 are preferably abutted one against the other, and it may be desirable to provide pins extending outwardly from one face into identically positioned apertures in the face of the opposing member in order to insure their proper registration.

A V-shaped bar 47 may be welded to the foremost section of the shell as at 48, the apex portion being bored and tapped as at 49 to receive holding means such as bolt 50, which may be an eyebolt if more than one carrier of this type is to be towed in series. When the two sections are placed in proper alignment the bolt may be extended through the rear end of the shell and screwed into the V-shaped member 47 as at 49 in order to hold the two sections together.

On the base or lower shell member 42 is secured a semi-circular collar 51 co-operating with the complementary collar 52 loosely associated therewith as by bolts 53. A detector 54 placed within the collar members may be firmly held in position by taking up on the bolts 53. Wires 57 may be extended through aperture 56 in the forward end of the casing to which latter is secured an eye 55. When the device of Figures 3 and 4 is to be used, a cable is attached to the eye 55 as by a clevis, and wires 57 either secured to the outside of the cable or connected to conductors therewithin, in order that the electrical impulses which are generated by the detector when in position to detect ground motion, may be carried to the amplifying and recording system of the seismograph.

In Figures 5 and 6 is illustrated another form of detector-carrying device. This consists of a pair of concentric cylinders 58 and 59 joined by a plurality of radially extending fins or blades 60. The upper part of the inner cylinder 59 is constructed in the form of an air-tight buoyant chamber 63 by sealing the upper end with a conical member 61 and providing a disc-like diaphragm 62 somewhat above the central portion of the cylinder. A lower chamber 64 is thus provided in the lower portion of cylinder 59, below the diaphragm 62, which lower chamber is adapted to hold a detector 64a.

One of the fins 60 is extended beyond the periphery of the outer cylinder 58 and portions 65 and 66 of the outer cylinder bent outwardly and extended parallel thereto and in contact therewith. This provides an external fin to which a towing cable 33 may be attached as through a connection 67b secured to the carrier by pins 67c extending through apertures 67. In the external fin assembly apertures 58a and 59a may be extended respectively through the outer cylinder 58 and the inner cylinder 59 so that the detector 64a within the chamber 64 may be connected with the seismographic apparatus aboard the vessel as through conductors 33a disposed within the towing cable 33.

The carrying device shown in Figures 5 and 6 is of very sturdy construction and is adapted to be towed through the water without excessive resistance. When the towing cable is secured by a clevis arrangement, such as that shown, to one of the apertures 67 in the outwardly extending fin 65, 66, the device assumes an oblique position in the water, the specific angle of obliquity being determined by the particular aperture to which the cable is connected. When the towing cable is slacked off the device settles to the bottom in the approximate position illustrated in Figure 6, the buoyancy of chamber 63 and the weight of the detector in chamber 64 assisting in this respect. As the device settles to the bottom, the movement of water through the spaces between the respective cylinders and along the faces of the fins, further insures the downward movement of the device in a substantially upright position.

When tension is again placed on the towing cables the guiding surfaces again come into play and the device rises substantially vertically from its position on the bottom, gradually turning in the direction in which it is towed until it assumes its normal oblique towing position. Under certain conditions it may be desirable to connect the towing cable to the apex of the cone 61 in order to insure movement of the carrier through the water in the direction of its longitudinal axis.

In Figure 7 I have illustrated a float device to which the detector is raised after the required seismographic records are taken. The float proper is made of sturdy material constructed in the form of a cylinder 70, one end of which is closed by a flat plate 70a and the other end, preferably the forward end closed by a conical member 69, the assembly being securely held together as by welding in the form of a water-tight float. To the outer surface of the cylindrical portion of the float are secured a pair of straps 71 and 72, the ends of which follow the contour of the cylindrical surface of the float and the central portion of which extend vertically downwardly in the form of a U as at 73. The sides of the U are apertured as at 74 in order to serve as bearings for the shafts 75 to which sheaves 76 are secured as by keys for splines. This construction enables cable 33, by or through which one or more detectors 78a may be connected to the towing vessel to be reeved through the sheaves as shown in Figure 8. The end of the cable is preferably provided with a weight 77 located somewhat above the end of the cable which end is secured to an eye 79 on a housing 78 in which a detector 78a is housed. The housing 78 preferably has an aperture 79a through which a pair of wires 79b may be extended in order to connect the detector with the towing vessel, as through conductors located within the towing cable 33. It is desirable to provide a relatively heavy base 79c for the housing 78 in order to insure the detector assuming an upright position when the casing is lowered to the bottom.

When the towing cable 33 is slacked off, the combined weights of the housing 78, detector 78a and weight 77, cause the detectors to settle rapidly to the bottom, the cable 33 running freely through sheaves 76. When the detector is on the bottom the weight 77 serves to take the strain of any small jerks on the cable caused by the float bobbing up and down in the water, which irregularities might seriously interfere with the operation of the detectors. The weight 77 also acts as a stop so that when the cable 33 is again placed under tension, the same may run over sheaves 76 until the weight 77 stops any further progress of the cable through the pulley sheaves, at which time the float starts moving forward in the direction of the tow, at the same speed as that of the towing vessel.

A plurality of floats like that shown in Figure 7 may be towed by securing them upon separate extensions or taps from a main cable, each tap being at least twice as long as the depth of the water to be surveyed. When the towing vessel is in motion, the device, due to water resistance, will be at the extremity of the tap, and supporting the detector. When the towing cable is released by the towing vessel, water resistance on the cable and device will tend to stop its forward motion and gravity will cause the detector to sink to the bottom. Gravity will also cause the main towing cable to sink to the bottom. Therefore, if the float is to remain on the surface, (which may be desirable though not necessary) the tap must be more than twice the water depth in length. For instance, the taps may be as much as 250 feet long.

In Figure 9 I have illustrated a collapsible type of float consisting of an inflatable body 80 connected through a nipple 82, sealed within the body of re-inforcement 82a, L 83, nipple 84, and air hose 85 to the towing vessel, in a manner similar to that illustrated diagrammatically in Figure 2. A strap 81 of flexible material may be secured to the exterior of the body 80 in order to assist in supporting re-enforcement 82a, L 83 and its associated structure.

A clamp 86 may be secured around the hose 85 in order to hold it securely to the nipple 84. A similar clamp 87 may be secured around the hose 85 and provided with a ring 88, to which a detector such as that indicated in Figure 8 may be attached.

A strap 81a may be provided at the rear of the collapsible body and provided with a loop to which a weight 89 may be secured, the latter acting to bring the body to the bottom when the same is deflated.

It will be observed that when the device of Figure 9 is inflated through the towing hose 85, it assumes in general the position indicated in that figure, the detector secured to ring 88 and the weight 89 secured to strap 81a, serving to balance the body fore and aft in such manner as most effectively to insure the easy progress of the assembly through the water as it is being towed. When the pressure within the body 80 is released, as by opening a valve in the vessel end of hose 85, the body collapses, and the combined weight of the detectors and the weight 89, causing the same to sink rapidly to the bottom of the ocean or other body of water in which the survey is being made.

It will be noted that the detector, being provided with a relatively heavy base 79c, assumes an upright position on the bottom. When in such position the small weight 89 serves to hold the collapsed float to the bottom, thereby minimizing the possibility of disturbance to the detector by movement of the water in the vicinity of the detectors. After recording a seismogram, the float is again inflated as by means of a pump on the towing vessel, thus causing the float and the detectors to rise to the surface from which they can be towed through towing means 85 to the next recording position.

In Figures 10 and 11 I have shown a further form of detector carrier. This form is the same as that described in connection with the description of the surveying method illustrated in Figure 2, and represents the presently preferred form of carrier constructed in accordance with the principles herein disclosed. Radially extending fins or ribs 90 are secured at their upper inner edges in the manner shown, their lower inner edges being cut out a sufficient distance to provide a space for a detector 101. At the bottom of fins 90 are provided concentric rings 91 and 92, the latter serving to hold the bottom of the detector 101 in position. The outer ring 91 preferably encompasses the outer edges of the fins 90, as shown more particularly in Figure 11, so that the assembly is held together in a strong and unitary manner.

In order to provide a parachute effect, a strip 93 may be extended obliquely across the face of each fin 90, which strip may be secured to the respective fins by screws extending through the strip and into tapped and drilled holes in the fins. Between each strip and each fin the edges of a flexible member 94 may be secured, the member 94 being, for instance, in the form of a vulcanized rubber sheet, the intermediate portion of which is sufficiently loose so that when the device is moved in an upward direction such as that shown by the arrow in Figure 11, the members 94 will lie substantially flat along the sides of the fins 90.

One of the fins 90 is provided with apertures 96, to one of which a towing cable 33 may be attached as by clevis 97. The angle at which the device will lie as it is being towed through the water is determined by the particular aperture to which the cable is attached, as is also the trajectory of the device as it is moved from its position on the bottom when tension is applied to the cable 33. The cable 33 preferably contains conductors 99 which extend from the end of the cable, through an aperture in the flexible members 94, along the sides of the fins 90 and through apertures 100 in the detector 101, thus providing a means for electrically connecting the detector with the amplifying and recording apparatus on the vessel.

The provision of a "parachute" 94 may not always be found desirable, but in some cases it will be found advantageous in order to permit the slow descent of the detector 101 and to insure that the towing cable 33 sinks to the bottom first and there remains stationary. This avoids the possibility of movement of the cable and disturbance of the detector during the time the detector rests upon the bottom.

In Figure 12 I have shown how my novel mining method may be accomplished, after the underwater structure 109 has been located and identified, e. g. as the type containing an oil-bearing formation 110. A considerable mass 102 of the ocean floor F surrounding the location above structure 109 is dredged as by a suction dredge, and deposited on the ocean floor as at 103, until the volume of fill is sufficient to extend above water, as at 104, in the form of an island. After the dredging and depositing operation is completed and the fill 103 and 104 sufficiently settled to provide a foundation, an oil derrick 105 is erected upon the island and a shaft 106 drilled through it and through the intervening strata as at 107, 108 and 109, to the oil-bearing formation 110, after which the well may be capped and mined by known methods.

The novel mining method is particularly suited for use in relatively shallow waters such as the coastal areas in the Gulf of Mexico, but it may be used with advantage in deeper waters where the potential value of the product warrants the increased cost of building an island in such deep waters. I have found that it is possible, particularly in waters of less than twenty fathoms in depth, to dredge the surrounding areas and build a sizable island over the deposit at costs well within those permitted by standard well-drilling or mining practice. When the fill has settled it is resistant to the action of heavy seas, and depending upon the size of the island, will stand up for a considerable period of time.

The novel mining method is of peculiar interest and advantage in that its practice includes the step of forming land in the water, such as the ocean or the Gulf of Mexico, which land did not exist before. In the event such land lies outside the territorial limits of the United States, which according to international law is generally considered to be three miles, such land and the mineral wealth lying thereunder may be claimed for or under the sovereignty of the United States, thereby adding new territories and natural resources to the nation. Such advantages are directly derivable from an understanding of the principles of the invention and the practice thereof.

Having thus fully described the invention, what is claimed as new and desired to be secured by Letters Patent is:

1. The method of making geophysical observations for determining the location and nature of underwater geological structures from a moving vessel which method comprises establishing a shot point by planting an explosive charge on the bottom of the body of water under which observations are to be taken, proceeding on a predetermined course a predetermined distance from said shot point while simultaneously towing a plurality of detectors through the water and then permitting said detectors to sink to the bottom, establishing another shot point in predetermined spaced relationship to the first while maintaining contact with the first shot point and with the detectors, exploding the charges located at said shot points consecutively and making geophysical observations therefrom, and then raising the detectors substantially simultaneously from the bottom and continuing to tow them through the water.

2. The method of determining the nature and location of subsurface geological structures from a moving vessel comprising proceeding from a shot point a predetermined distance while towing a plurality of seismographic detectors, said detectors remaining stationary in upright position while proceeding to a second shot point and maintaining electrical contact with the first and with the said detectors and there exploding charges at said shot points consecutively and obtaining seismographic readings therefrom through said stationary detectors.

3. The method of determining the nature and location of underwater geological formations comprising establishing a shot point from a moving vessel by lowering an explosive charge from the vessel to the bottom of the body of water under which the said formations lie, proceeding from a predetermined distance while maintaining electrical contact with said shot point, and while towing a plurality of detectors through the water in spaced relationship with each other, then lowering said detectors to the bottom, proceeding to another shot point while maintaining contact with the first, and then exploding the charges at such shot points consecutively and simultaneously taking a seismographic record of the amplitude and frequency of the waves generated thereby.

4. The method of making continuous geophysical surveys of land beneath water from a floating vessel which consists in lowering an explosive charge from the vessel to a stationary position, proceeding a given distance, sinking seismographic detectors, proceeding another given distance, lowering a second explosive charge, detonating the charges, and obtaining and interpreting readings resulting from the detonations.

5. The method of making geophysical surveys of land beneath water from a single floating vessel which consists in lowering an explosive charge from the vessel to a stationary position, proceeding a given distance, sinking seismographic detectors, proceeding another given distance, lowering a second explosive charge to a stationary position, detonating the charges, and obtaining and interpreting readings resulting from the detonations.

6. The method of making geophysical surveys of land beneath water from a continuously moving vessel which consists in lowering an explosive charge from the vessel, proceeding a given distance, sinking seismographic detectors in predetermined spaced relation, proceeding another given distance, lowering a second explosive charge, detonating the charges, and obtaining and interpreting readings resulting from the detonations by use of instruments carried by the vessel.

7. In the method of seismic explorations for submerged geological formations, the steps of proceeding with a vessel along a predetermined course in the submerging medium, lowering an explosive charge from the vessel to a stationary position, proceeding a given distance while towing a cable and a plurality of seismic detectors spaced at suitable intervals on the towing cable, releasing an additional length of cable whereby the seismic detectors become steady at points within the submerging medium during continued progress of the vessel, detonating the charge, making a record of the impulses detected by the detectors, reapplying a towing force to pick up the detectors, and reclaiming the additional length of cable preparatory to releasing it at a subsequent location.

8. In the method of seismic explorations for submerged geological formations, the steps of proceeding with a vessel along a predetermined course in the submerging medium, lowering an explosive charge from the vessel to a stationary position, proceeding a given distance while towing a cable and a plurality of seismic detectors spaced at suitable intervals on the towing cable, releasing an additional length of cable whereby the seismic detectors become steady at points within the submerging medium during continued progress of the vessel, detonating the charge, and making a record of the impulses detected by the detectors.

9. In the method of seismic exploration for submerged geological formations, the steps of proceeding with a vessel along a predetermined course in the submerging medium, lowering an explosive charge from the vessel, whereby it comes to rest and remains stationary at the bottom of the submerging medium, proceeding a given distance while towing a plurality of seismic detectors spaced at suitable distances on a towing cable, lowering a second explosive charge, releasing an additional length of towing cable, whereby the seismic detectors come to rest, successively detonating the charges, making records of the impulses detected by each detector produced by each of the detonated charges, reapplying a towing force to pick up the detectors and reclaiming the additional length of cable preparatory to releasing at a subsequent location.

10. In the making of geophysical observations for determining the location and nature of submerged geological structures the steps of proceeding with a continuously moving vessel upon a predetermined course in the submerging medium while towing through the medium a length of cable and a device responsive to subsurface geological variations, discontinuing the towing whereby said device becomes steady at a point within the submerging medium, making an observation with said device while in a steady position, thereafter resuming towing of the device and repeating the operations to obtain successive measurements along the predetermined course.

11. In the method of making geophysical observations for determining location and nature of submerged geological structures, the steps of proceeding with a vessel upon a predetermined course in the submerging medium while towing through the medium a length of cable and a device responsive to subsurface variations, releasing an additional length of cable whereby said device comes to rest and becomes steady at a point within the submerging medium during continued progress of the vessel, making an observation of the indications of such device while in such steady position, thereafter resuming towing of the device and repeating the operations to obtain successive indications along the predetermined course.

JOHN W. FLUDE.